US012217404B2

(12) United States Patent
Yuan et al.

(10) Patent No.: US 12,217,404 B2
(45) Date of Patent: *Feb. 4, 2025

(54) IMAGE PROCESSING METHOD AND APPARATUS AND TERMINAL DEVICE

(71) Applicant: Huawei Technologies Co., Ltd., Shenzhen (CN)

(72) Inventors: Le Yuan, Shenzhen (CN); Zheng Wang, Shenzhen (CN); Xiumei Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

This patent is subject to a terminal disclaimer.

(21) Appl. No.: 17/581,193

(22) Filed: Jan. 21, 2022

(65) Prior Publication Data

US 2022/0148141 A1    May 12, 2022

Related U.S. Application Data

(63) Continuation of application No. 16/596,269, filed on Oct. 8, 2019, now Pat. No. 11,263,730, which is a continuation of application No. PCT/CN2017/114565, filed on Dec. 5, 2017.

(30) Foreign Application Priority Data

Apr. 21, 2017    (CN) .......................... 201710266941.3

(51) Int. Cl.
*G06T 5/92*    (2024.01)
*G06T 11/00*   (2006.01)

(52) U.S. Cl.
CPC .............. *G06T 5/92* (2024.01); *G06T 11/001* (2013.01); *G06T 2207/10016* (2013.01); *G06T 2207/20208* (2013.01)

(58) Field of Classification Search
None
See application file for complete search history.

(56) References Cited

U.S. PATENT DOCUMENTS 10,051,319 B2 *   8/2018  Nishi .................. H04N 21/4402
10,264,266 B2 *   4/2019  Pan .......................... H04N 5/20
10,477,141 B1 *  11/2019  Huang ................. H04N 21/435
11,263,730 B2 *   3/2022  Yuan ......................... G06T 5/92
(Continued)

FOREIGN PATENT DOCUMENTS

CN    104813666 A    7/2015
CN    105594204 A    5/2016
(Continued)

*Primary Examiner* — Ishrat I Sherali
(74) *Attorney, Agent, or Firm* — Conley Rose, P.C.

(57) ABSTRACT

An image processing method includes determining a format of first image data; determining a first interface mode that is currently used, where the first interface mode is determined when the processing device establishes physical connections with a display device, and the format of the first image data format is not supported by the first interface mode; and processing the first image data based on the first interface mode to generate second image data, where a format of the second image data is supported by the first interface mode. Image data will be processed when an image format of the image data is not supported by the first interface mode.

20 Claims, 4 Drawing Sheets

(56) References Cited

U.S. PATENT DOCUMENTS

| | | | |
|---|---|---|---|
| 2013/0055328 A1* | 2/2013 | Chen | G09G 5/006 |
| | | | 725/110 |
| 2015/0169235 A1 | 6/2015 | Kang | |
| 2015/0243200 A1* | 8/2015 | Pan | H04N 19/30 |
| | | | 345/590 |
| 2015/0326918 A1* | 11/2015 | Oh | H04N 21/4363 |
| | | | 348/445 |
| 2016/0112715 A1 | 4/2016 | Hattori et al. | |
| 2016/0241829 A1 | 8/2016 | Qu et al. | |
| 2016/0309154 A1 | 10/2016 | Rusanovskyy et al. | |
| 2016/0343348 A1 | 11/2016 | Oh | |
| 2016/0373712 A1* | 12/2016 | Yamamoto | H04N 21/4402 |
| 2017/0094344 A1 | 3/2017 | Kozuka et al. | |
| 2017/0171506 A1* | 6/2017 | Zhang | H04N 21/440218 |
| 2017/0311034 A1* | 10/2017 | Nishi | G09G 5/10 |
| 2018/0192115 A1 | 7/2018 | Cruz | |
| 2018/0332210 A1 | 11/2018 | Kamiya | |
| 2020/0035198 A1* | 1/2020 | Kouno | G09G 5/003 |
| 2024/0046852 A1* | 2/2024 | Lin | G09G 3/2092 |

FOREIGN PATENT DOCUMENTS

| | | |
|---|---|---|
| CN | 105977192 A | 9/2016 |
| CN | 105979192 A | 9/2016 |
| CN | 106170102 A | 11/2016 |
| JP | 2016111691 A | 6/2016 |
| JP | 2016195379 A | 11/2016 |
| WO | 2017051808 A1 | 3/2017 |

* cited by examiner

200

A processing device in a display system determines a format of first image data, where the format of the first image data is a first image data format — S210

The processing device determines a first interface mode that is currently used, where the first interface mode is determined when the processing device is connected to a display device physically, and the first image data format is not an image format supported by the first interface mode — S220

A format of a second image data is a second image data format, and the second image data format is the image format supported by the first interface mode — S230

FIG. 2

IMAGE PROCESSING METHOD AND APPARATUS AND TERMINAL DEVICE

CROSS-REFERENCE TO RELATED APPLICATIONS

This is a continuation of U.S. patent application Ser. No. 16/596,269 filed on Oct. 8, 2019, which is a continuation of International Patent Application No. PCT/CN2017/114565 filed on Dec. 5, 2017, which claims priority to Chinese Patent Application No. 201710266941.3 filed on Apr. 21, 2017. All of the aforementioned patent applications are hereby incorporated by reference in their entireties.

TECHNICAL FIELD

This application relates to the field of display processing technologies, and more specifically, to an image processing method and apparatus and terminal device in the field of display processing technologies.

BACKGROUND

Compared with a conventional standard dynamic range (SDR) video, a high dynamic range (HDR) video, as a new video technology, may greatly improve viewing experience of an audience.

For a hybrid video stream that includes both an HDR video (for example, a movie) and an SDR video (for example, an advertisement), when the hybrid video stream arrives at a playback device, the playback device sends a high definition multimedia interface (HDMI) reset signal to a display device (for example, the display device supports HDR video playing). The reset signal is used to force the display device to reinitialize an HDMI standard. Therefore, when receiving the hybrid video stream, the display device can sense a video mode change of the hybrid video stream in terms of time, convert the hybrid video stream into a play mode supported by the display device, and finally play a converted video.

In the foregoing solution, when detecting that a video stream includes both the HDR video and the SDR video, the playback device sends the HDMI reset signal to the display device. However, when switching between the HDR video and the SDR video occurs for a plurality of times in a segment of the video stream, the playback device needs to send the HDMI reset signal to the display device for a plurality of times.

Because the display device reinitializes the HDMI standard for a relatively long time, frequently sending the HDMI reset signal to the display device by the playback device causes one or more seconds of black screen of the display device, severely affecting viewing experience of a user.

SUMMARY

This application provides an image processing method and apparatus, to avoid one or more seconds of black screen of a display device, thereby improving viewing experience of a user.

According to a first aspect, an image processing method is provided, and is applied to a display system that supports N types of interface modes, where N≥1, and the display system includes a processing device and a display device. The method includes determining, by the processing device in the display system, a format of first image data, where the format of the first image data is a first image data format, determining, by the processing device, a first interface mode that is currently used, where the first interface mode is determined when the processing device establishes physical connections with the display device, and the first image data format is not an image format supported by the first interface mode, and processing, by the processing device, the first image data based on the first interface mode to generate second image data, where a format of the second image data is a second image data format, and the second image data format is the image format supported by the first interface mode.

Image data will be processed when an image format of the image data is not supported by the first interface mode (the first interface mode is determined when the processing device establishes physical connections with the display device) such that a format of processed image data can be supported by the first interface mode (namely, the format of the second image data), to avoid one or more seconds of black screen of the display device resulting from re-initialization of an interface mode between the processing device and the display device caused by inconsistency of the format of the first image data and the first interface mode, thereby improving viewing experience of a user.

With reference to the first aspect, in a first implementation of the first aspect, the method further includes sending, by the processing device, the second image data to the display device, where the processing device is a playback device.

The processing device sends the processed image data to the display device such that the display device can display the processed image data (namely, the second image data) in a uniform format in order to avoid one or more seconds of black screen of the display device caused by inconsistency between a format of image data and an image format supported by the first interface mode, thereby improving viewing experience of a user.

With reference to the first aspect or the foregoing implementation, in a second implementation of the first aspect, the processing, by the processing device, the first image data to generate second image data includes converting, by the processing device, the first image data from a first color space to a second color space, performing, by the processing device, dynamic range mapping on a luminance component of image data corresponding to the second color space, where the image data corresponding to the second color space is obtained after color space conversion is performed on the first image data, restoring, by the processing device, image data obtained after performing the dynamic range mapping on the luminance component into a linear optical space, performing, by the processing device, a color gamut mapping on image data restored into the linear optical space, and performing, by the processing device, non-uniform encoding on image data obtained after performing the color gamut mapping, to generate the second image data.

With reference to the first aspect and the foregoing implementations, in a third implementation of the first aspect, the first image data format is an image format corresponding to an SDR, and the second image data format is an image format corresponding to an HDR, or the first image data format is an image format corresponding to an HDR, and the second image data format is an image format corresponding to an SDR, or the first image data format is an image format corresponding to an HDR of a hybrid log-gamma (HLG) standard, and the second image data format is an image format corresponding to an HDR of a perceptual quantizer (PQ) standard, or the first image data format is an image format corresponding to an HDR of a PQ standard, and the second image data format is an image format corresponding to an HDR of an HLG standard.

With reference to any one of the first aspect and the foregoing implementations, in a fourth implementation of the first aspect, the first interface mode is an HDMI operation mode.

With reference to any one of the first aspect and the foregoing implementations, in a fifth implementation of the first aspect, the first image data includes a video image and/or a graphic image.

Image processing is performed on the video image, image processing is also performed on a graphic image related to the video image, and a processed video image and a processed graphic image are sent to the display device together, thereby improving viewing experience about the graphic image of a user.

According to a second aspect, an image processing apparatus is provided, and is applied to a display system that supports N types of interface modes, where N≥1, and the display system includes the apparatus and a display device. The apparatus includes a determining unit configured to determine a format of first image data, where the format of the first image data is a first image data format, the determining unit is further configured to determine a first interface mode that is currently used, the first interface mode is determined when the apparatus establishes physical connections with the display device, and the first image data format is not an image format supported by the first interface mode, and a processing unit configured to process the first image data based on the first interface mode to generate second image data, where a format of the second image data is a second image data format, and the second image data format is an image format supported by the first interface mode.

Image data will be processed when an image format of the image data is not supported by the first interface mode (the first interface mode is determined when the apparatus establishes physical connections with the display device) such that a format of processed image data (namely, the format of the second image data) can be supported by the first interface mode, to avoid one or more seconds of black screen of the display device resulting from reinitialization of an interface mode between the apparatus and the display device caused by inconsistency of the format of the first image data and the first interface mode, thereby improving viewing experience of a user.

With reference to the second aspect, in a first implementation of the second aspect, the apparatus further includes a sending unit configured to send the second image data to the display device, where the apparatus is a playback device.

The apparatus sends the processed image data to the display device such that the display device can display the processed image data (namely, the second image data) in a uniform format, to avoid one or more seconds of black screen of the display device caused by inconsistency between a format of image data and an image format supported by the first interface mode, thereby improving viewing experience of a user.

With reference to the second aspect or the foregoing implementation, in a second implementation of the second aspect, the processing unit is configured to convert, the first image data from a first color space to a second color space, perform, dynamic range mapping on a luminance component of image data corresponding to the second color space, where the image data corresponding to the second color space is obtained after color space conversion is performed on the first image data, restore image data obtained after performing the dynamic range mapping on the luminance component into a linear optical space, perform color gamut mapping on image data restored into the linear optical space, and perform non-uniform encoding on image data obtained after performing the color gamut mapping, to generate the second image data.

With reference to the second aspect and the foregoing implementations, in a third implementation of the second aspect, the first image data format is an image format corresponding to an SDR, and the second image data format is an image format corresponding to an HDR, or the first image data format is an image format corresponding to an HDR, and the second image data format is an image format corresponding to an SDR, or the first image data format is an image format corresponding to an HDR of an HLG standard, and the second image data format is an image format corresponding to an HDR of a PQ standard, or the first image data format is an image format corresponding to an HDR of a PQ standard, and the second image data format is an image format corresponding to an HDR of an HLG standard.

With reference to any one of the second aspect and the foregoing implementations, in a fourth implementation of the second aspect, the first interface mode is an HDMI operation mode.

With reference to any one of the second aspect and the foregoing implementations, in a fifth implementation of the second aspect, the first image data includes a video image and/or a graphic image.

Image processing is performed on the video image, image processing is also performed on a graphic image related to the video image, and a processed video image and a processed graphic image are sent to the display device together, thereby improving viewing experience about the graphic image of a user.

According to a third aspect, an image processing apparatus is provided, and is applied to a display system that supports N types of interface modes, where N≥1, and the display system includes the image processing apparatus and a display device. The image processing apparatus includes a memory and a processor. The memory is configured to store instructions. The processor is configured to invoke the instructions stored in the memory to perform the following steps determining a format of first image data, where the format of the first image data is a first image data format, and determining a first interface mode that is currently used, where the first interface mode is determined when the image processing apparatus establishes physical connections with the display device, and the first image data format is not an image format supported by the first interface mode. The processor is further configured to process the first image data based on the first interface mode to generate second image data, where a format of the second image data is a second image data format, and the second image data format is the image format supported by the first interface mode.

Image data will be processed when an image format of the image data is not supported by the first interface mode (the first interface mode is determined when the image processing apparatus establishes physical connections with the display device) such that a format of processed image data can be supported by the first interface mode (namely, the format of the second image data), to avoid one or more seconds of black screen of the display device resulting from re-initialization of an interface mode between the image processing apparatus and the display device caused by inconsistency of the format of the first image data and the first interface mode, thereby improving viewing experience of a user.

With reference to the third aspect, in a first implementation of the third aspect, the image processing apparatus further includes an output interface configured to send the second image data to the display device, where the image processing apparatus is a playback device.

The image processing apparatus sends the processed image data to the display device such that the display device can display the processed image data (namely, the second image data) in a uniform format, to avoid one or more seconds of black screen of the display device caused by inconsistency between a format of image data and an image format supported by the first interface mode, thereby improving viewing experience of a user.

With reference to the third aspect or the foregoing implementation, in a second implementation of the third aspect, the processor is configured to convert the first image data from a first color space to a second color space, perform dynamic range mapping on a luminance component of image data corresponding to the second color space, where the image data corresponding to the second color space is obtained after color space conversion is performed on the first image data, restore image data obtained after performing the dynamic range mapping on the luminance component into a linear optical space, perform color gamut mapping on image data restored into the linear optical space, and perform non-uniform encoding on image data obtained after performing the color gamut mapping, to generate the second image data.

With reference to the third aspect and the foregoing implementations, in a third implementation of the third aspect, the first image data format is an image format corresponding to an SDR, and the second image data format is an image format corresponding to an HDR, or the first image data format is an image format corresponding to an HDR, and the second image data format is an image format corresponding to an SDR, or the first image data format is an image format corresponding to an HDR of an HLG standard, and the second image data format is an image format corresponding to an HDR of a PQ standard, or the first image data format is an image format corresponding to an HDR of a PQ standard, and the second image data format is an image format corresponding to an HDR of an HLG standard.

With reference to any one of the third aspect and the foregoing implementations, in a fourth implementation of the third aspect, the first interface mode is an HDMI operation mode.

With reference to any one of the third aspect and the foregoing implementations, in a fifth implementation of the third aspect, the first image data includes a video image and/or a graphic image.

Image processing is performed on the video image, image processing is also performed on a graphic image related to the video image, and a processed video image and a processed graphic image are sent to the display device together, thereby improving viewing experience about the graphic image of a user.

According to a fourth aspect, a computer storage medium is provided, where the computer storage medium stores program code, and the program code is used to indicate operations for implementing the image processing method in the first aspect or any optional implementations of the first aspect.

DESCRIPTION OF DRAWINGS

FIG. 2 is a schematic flowchart of an image processing method according to this application.

DESCRIPTION OF EMBODIMENTS

The following describes the technical solutions of this application with reference to the accompanying drawings.

Figure 1:
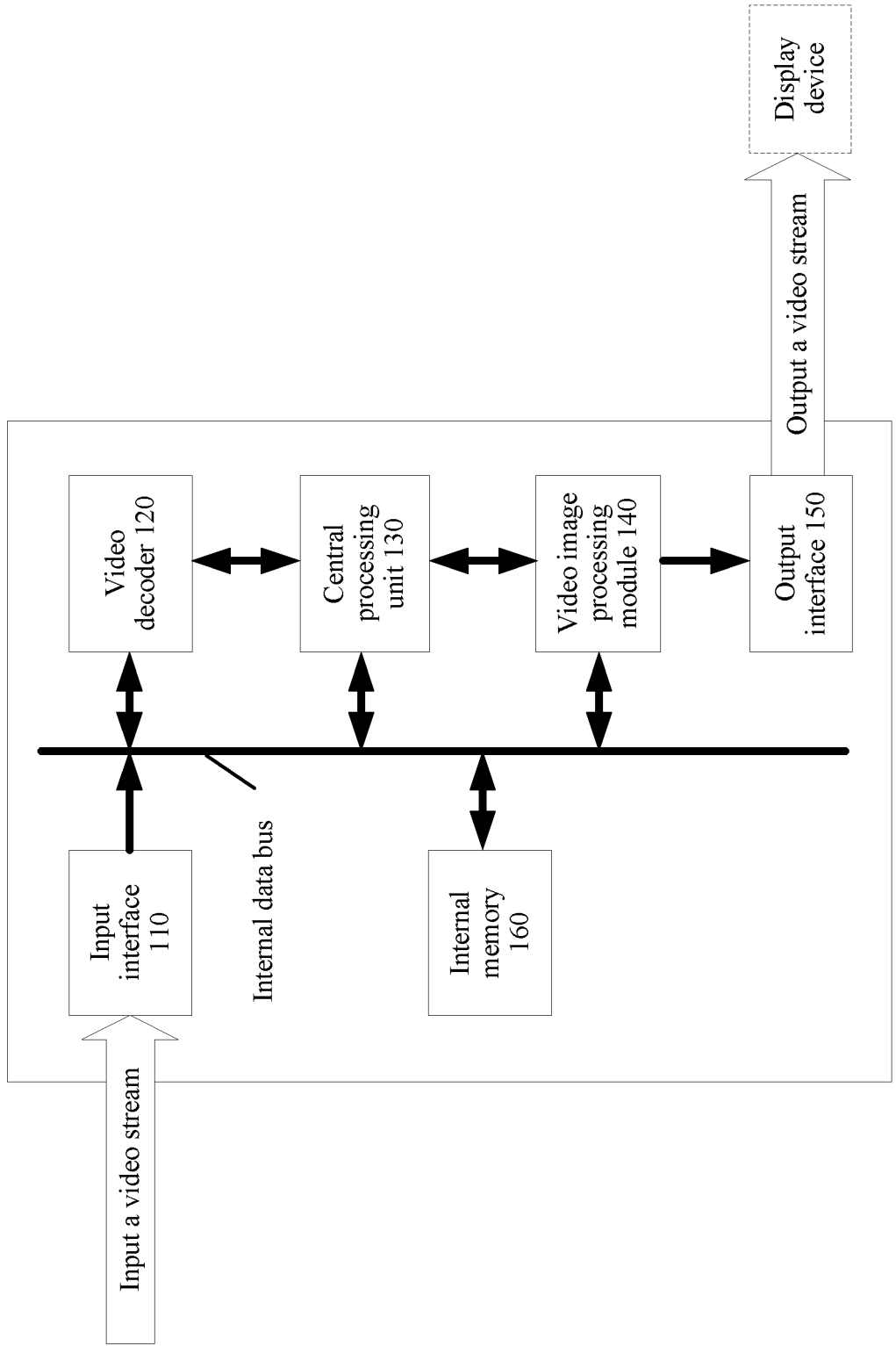
FIG. 1 is a schematic structural diagram of a processing device for image processing according to this application.

FIG. 1 is a schematic structural diagram of a processing device in a display system to which this application is applicable. The processing device includes components such as an input interface 110, a video decoder 120, a central processing unit (CPU) 130, a video image processing module 140, an output interface 150, and an internal memory 160.

A person skilled in the art may understand that the structural diagram of the processing device shown in FIG. 1 is merely an example instead of a limitation. The processing device may further include more or fewer components than those shown in the figure, or may include different component settings.

First, a video data stream is transmitted from the input interface 110 (for example, a wired network port or a wireless network port) to the processing device, and is stored in the internal memory 160 using an internal data bus. The CPU 130 and the video decoder 120 decode the video data stream stored in the internal memory 160. The video image processing module 140 accesses the internal memory 160 using the internal data bus, obtains decoded video data from the internal memory 160, determines a format of the video based on the decoded video data, and further determines whether to perform format conversion on the video data.

Then, the video image processing module 140 outputs video data (for example, video image data or graphic image data) obtained after format conversion or unconverted video data (for example, video image data or graphic image data) to a display device (for example, a television set) through the output interface 150.

It should be noted that, usually, the CPU 130 may directly access the video decoder 120 and the video image processing module 140. This is not limited in this application.

FIG. 2 is a schematic flowchart of an image display method 200 according to this application. As shown in FIG. 2, the method 200 is applied to a display system that supports N types of interface modes, where N≥1, the display system includes a processing device and a display device, and the method 200 includes the following steps.

S210. The processing device in the display system determines a format of first image data, where the format of the first image data is a first image data format.

S220. The processing device determines a first interface mode that is currently used, where the first interface mode is determined when the processing device establishes physical connections with the display device, and the first image data format is not an image format supported by the first interface mode.

S230. The processing device processes the first image data based on the first interface mode to generate second image data, where a format of the second image data is a second image data format, and the second image data format is the image format supported by the first interface mode.

In an embodiment, the processing device in the display system first determines the format of the received first image data, namely, the first image data format. The display system in which the processing device is located supports N types of interface modes. After determining the format of the first image data that is currently received, the processing device further determines an interface mode that is currently used (namely, the first interface mode). The first interface mode is determined through negotiation when the processing device establishes physical connections with the display device. The first image data format is not an image format supported by the first interface mode, in an embodiment, the first interface mode does not support transmission of the first image data between the processing device and the display device.

Therefore, the processing device needs to convert the format of the first image data based on the first interface mode such that the first interface mode can support the transmission of the first image data between the processing device and the display device.

For example, the processing device processes the first image data to generate the second image data. The format of the second image data is an image format supported by the first interface mode, in an embodiment, the first interface mode can support transmission of the second image data between the processing device and the display device.

It should be noted that the first image data and the second image data include video images and/or graphic images. In an embodiment, the first image data may be a video image or a graphic image, or the first image data may include both the video image and graphic image. The graphic image may include a control menu (for example, a volume adjustment progress bar or a video fast forward/rewind adjustment progress bar that is displayed on a display device), or the graphic image may be image data (for example, a static image shown in a video) included in video data. This is not limited in this application.

As an example instead of a limitation, the processing device may be a playback device (for example, a set top box). In addition, after performing format conversion on the first image data, the processing device sends the second image data to the display device, where the second image data is obtained after the format conversion of the first image data. The second image data is displayed by the display device.

It should be understood that the foregoing merely uses an example in which the processing device is a playback device for descriptions. However, this application is not limited thereto. The processing device may be another device (for example, a mobile phone device). In addition, the device has a function of obtaining a video data stream, decoding the video data stream, and sending the video data stream to the display device. This is not limited in this application.

As an example instead of a limitation, the processing, by the processing device, the first image data to generate the second image data includes the following steps. In step 1, the processing device converts the first image data from a first color space to a second color space, in step 2, the processing device performs dynamic range mapping on a luminance component of image data corresponding to the second color space, where the image data corresponding to the second color space is obtained after color space conversion is performed on the first image data, in step 3, the processing device restores image data obtained after the dynamic range mapping on the luminance component into a linear optical space, in step 4, the processing device performs color gamut mapping on image data obtained after the linear optical space restoration, and in step 5, the processing device performs non-uniform encoding on image data obtained after the color gamut mapping, to generate the second image data.

In an embodiment, after determining that decoded video image data (namely, the first image data) needs format conversion, the processing device first performs color space conversion on a video signal corresponding to the first image data, in an embodiment, converts the video signal from the first color space (for example, a luminence, chroma: blue, chroma: red (YCbCr) color space) to the second color space (for example, an red, green, blue (RGB) color space), where the RGB color space is suitable for adjusting an image range. After converting the video signal from the YCbCr color space to the RGB color space, the processing device performs dynamic range mapping on a luminance component corresponding to the video signal obtained after the color space conversion, in an embodiment, maps a dynamic range of the luminance component of the video signal to a dynamic range of a luminance component conforming to a video signal output format. The processing device performs restoration on a video signal conforming to the output format into the linear optical space, and then performs the color gamut mapping on the video signal after the restoration. During the color gamut mapping, the video signal in the linear optical space is mapped from a source color gamut to an output color gamut. The processing device performs non-uniform encoding on the video signal (namely, the video signal mapped to the output color gamut) to generate the second image data such that the format of the second image data conforms to an output format requirement of an output video signal.

Therefore, a processing procedure of converting the format of the first image data into the format of the second image data is completed.

It should be noted that execution sequences of the steps 1 to 5 shall not constitute any limitation on this application. For example, step 1, step 3, and step 4 may be performed before step 2 and step 5, which is not limited in this application.

As an example instead of a limitation, the first image data format is an image format corresponding to an SDR, and the second image data format is an image format corresponding to an HDR, or the first image data format is an image format corresponding to an HDR, and the second image data format is an image format corresponding to an SDR, or the first image data format is an image format corresponding to an HDR of an HLG standard, and the second image data format is an image format corresponding to an HDR of a PQ standard, or the first image data format is an image format corresponding to an HDR of a PQ standard, and the second image data format is an image format corresponding to an HDR of an HLG standard.

It should be noted that the foregoing method for processing the first image data is applicable to conversion between any two foregoing different image formats.

It should be understood that, in this application, conversion between the foregoing image formats is only used as an example to describe the image processing method in this application. However, this application is not limited thereto. The technical solutions of this application may further support format conversion between other different image formats, and this is not limited in this application.

As an example instead of a limitation, the first interface mode is an HDMI operation mode.

According to the image processing method in this application, image data corresponding to an image format that is not supported by the first interface mode (the first interface mode is determined when the processing device establishes physical connections with the display device) will be processed such that a format of processed image data can be supported by the first interface mode (namely, the format of the second image data), to avoid one or more seconds of black screen of the display device resulting from re-initialization of an interface mode between the processing device and the display device caused by inconsistency of the format of the first image data and the first interface mode, thereby improving viewing experience of a user.

Figure 3:
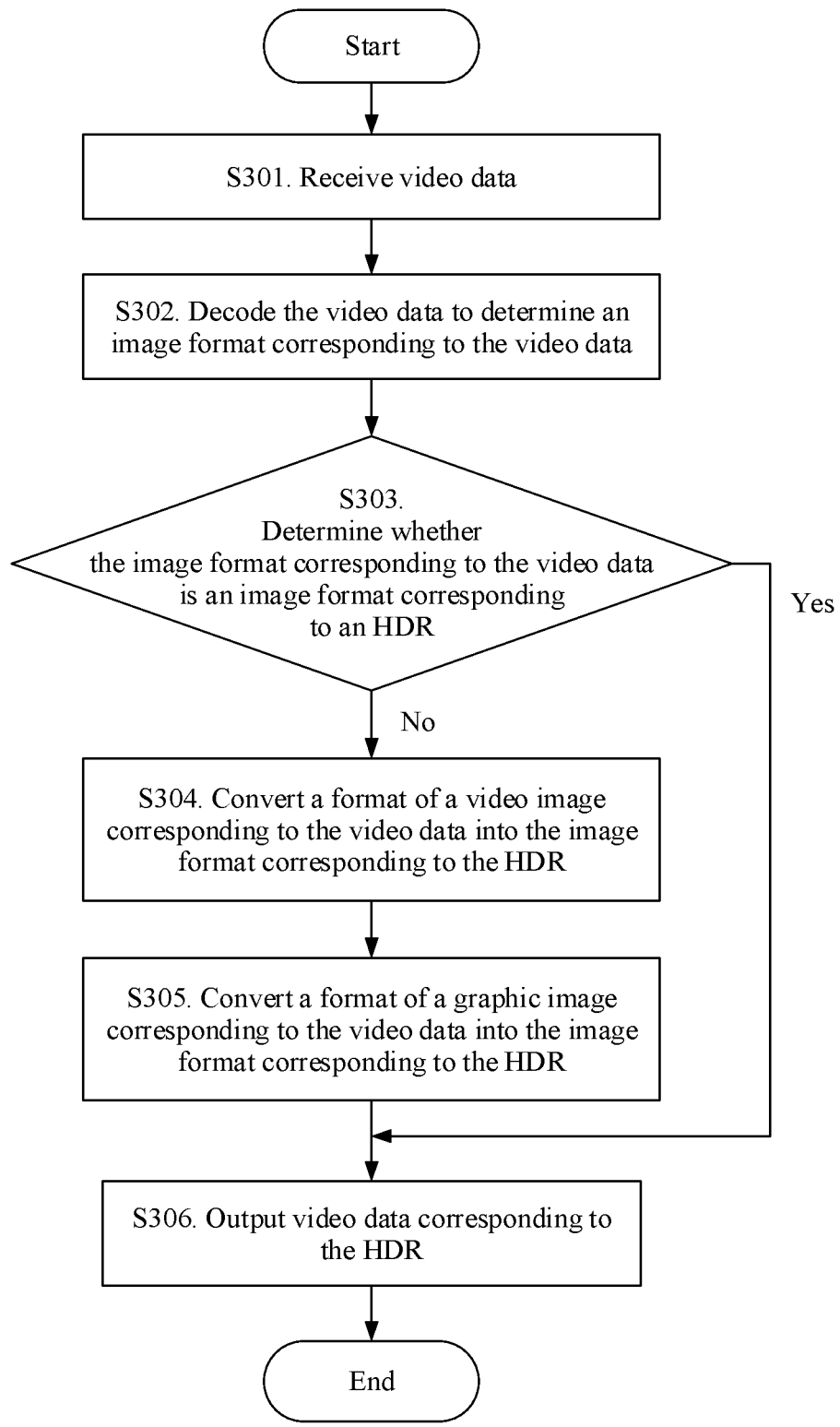
FIG. 3 is another schematic flowchart of an image processing method according to this application.

FIG. 3 is another schematic flowchart of an image processing method 300 according to this application.

The following describes the method 300 using an example in which a first image data format is an image format corresponding to an SDR, and a first interface mode is an interface mode that supports an image format corresponding to an HDR. The method 300 includes the following steps.

S301. Receive video data.

S302. Decode the video data to determine an image format corresponding to the video data.

In an embodiment, a processing device first receives video data transmitted from an input interface 110, and then decodes the video data to determine the image format corresponding to the video data. For example, the processing device determines that the image format corresponding to the video data is the image format corresponding to the SDR.

S303. Determine whether the image format corresponding to the video data is the image format corresponding to the HDR.

In an embodiment, after determining the image format corresponding to the input video data, the processing device needs to determine whether the image format corresponding to the video data is consistent with an image format supported by the first interface mode, and the first interface mode here supports the image format corresponding to the HDR. In other words, the processing device needs to determine whether the image format corresponding to the video data is the image format corresponding to the HDR.

It should be noted that the first interface mode may be determined when the processing device establishes physical connections with the display device, in other words, the image format supported by the first interface mode is determined when the processing device establishes physical connections with the display device.

S304. Convert a format of a video image corresponding to the video data into the image format corresponding to the HDR.

S305. Convert a format of a graphic image corresponding to the video data into the image format corresponding to the HDR.

In an embodiment, when determining that the image format corresponding to the video data is not the image format corresponding to the HDR, the processing device performs format conversion on the video image and the graphic image that correspond to the video data, in an embodiment, converts the formats of the video image and the graphic image that correspond to the video data into the image format corresponding to the HDR.

S306. Output video data corresponding to the HDR.

In an embodiment, when S303 is performed, if it is determined that the image format corresponding to the video data is the image format corresponding to the HDR, S306 (in an embodiment, the video data is output) is directly performed after S303. Alternatively, when S303 is performed, if it is determined that the image format corresponding to the video data is not the image format corresponding to the HDR, S304 and S305 (in an embodiment, by performing S304 and S305, the formats of the images corresponding to the video data are converted) are continuously performed after S303, and S306 is performed after S304 and S305. Finally, the format of the first image data is converted from the image format corresponding to the SDR into the image format corresponding to the HDR (namely, the format of the second image data).

It should be noted that execution sequences of the processes in the foregoing method 300 shall not constitute any limitation on the technical solutions of this application, in other words, the execution sequences of the processes in the method 300 are not limited in this application.

The image processing method according to this application is described above in detail with reference to FIG. 1 to FIG. 3. The following describes an image processing apparatus according to this application in detail with reference to FIG. 4.

Figure 4:
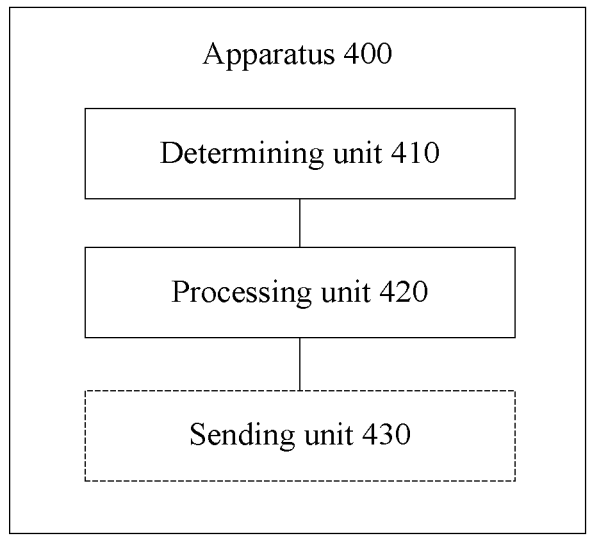
FIG. 4 is a schematic block diagram of an image processing apparatus according to this application.

FIG. 4 is a schematic block diagram of an image processing apparatus 400 according to this application. The apparatus 400 is applied to a display system that supports N types of interface modes, where N≥1, and the display system includes the apparatus and a display device. As shown in FIG. 4, the apparatus 400 includes a determining unit 410 and a processing unit 420.

The determining unit 410 is configured to determine a format of first image data, where the format of the first image data is a first image data format.

The determining unit 410 is further configured to determine a first interface mode that is currently used, where the first interface mode is determined when the apparatus establishes physical connections with the display device, and the first image data format is not an image format supported by the first interface mode.

The processing unit 420 is configured to process the first image data based on the first interface mode to generate second image data, where a format of the second image data is a second image data format, and the second image data format is the image format supported by the first interface mode.

Optionally, the apparatus 400 further includes a sending unit 430 configured to send the second image data to the display device, where the apparatus is a playback device.

Optionally, the processing unit 420 is configured to convert the first image data from a first color space to a second color space, perform dynamic range mapping on a luminance component of image data corresponding to the second color space, where the image data corresponding to the second color space is obtained after color space conversion is performed on the first image data, restore image data obtained after performing the dynamic range mapping on the luminance component into a linear optical space, perform color gamut mapping on image data restored into the linear optical space, and perform non-uniform encoding on image data obtained after performing the color gamut mapping, to generate the second image data.

Optionally, the first image data format is an image format corresponding to an SDR, and the second image data format is an image format corresponding to an HDR, or the first image data format is an image format corresponding to an HDR, and the second image data format is an image format corresponding to an SDR, or the first image data format is an image format corresponding to an HDR of an HLG standard, and the second image data format is an image format corresponding to an HDR of a PQ standard, or the first image data format is an image format corresponding to an HDR of a PQ standard, and the second image data format is an image format corresponding to an HDR of an HLG standard. Optionally, the first interface mode is an HDMI operation mode.

Optionally, the first image data includes a video image and/or a graphic image.

The image processing apparatus 400 according to this application may be corresponding to an implementation body of the image processing method 200 according to this application. In addition, units of the image processing apparatus 400 and other operations and/or functions described above are used to implement corresponding procedures of the method 200 in FIG. 2 respectively. For brevity, details are not described herein again.

According to the image processing apparatus in this application, image data corresponding to an image format that is not supported by the first interface mode (the first interface mode is determined when the image processing apparatus establishes physical connections with the display device) is processed such that a format of processed image data (namely, the format of the second image data) can be supported by the first interface mode, to avoid one or more seconds of black screen of the display device resulting from re-initialization of an interface mode between the image processing apparatus and the display device caused by inconsistency of the format of the first image data and the first interface mode, thereby improving viewing experience of a user.

The image processing method according to this application is described above in detail with reference to FIG. 1 to FIG. 3. The following describes an image processing apparatus according to this application in detail with reference to FIG. 5.

Figure 5:
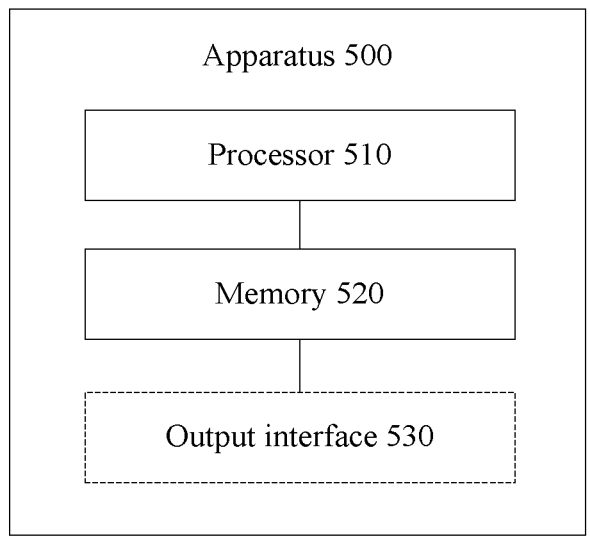
FIG. 5 is a schematic structural diagram of an image processing apparatus according to this application.

FIG. 5 is a schematic block diagram of an image processing apparatus 500 according to this application. The image processing apparatus 500 is applied to a display system that supports N types of interface modes, where N≥1, and the display system includes the image processing apparatus and a display device. As shown in FIG. 5, the image processing apparatus 500 includes a processor 510 and a memory 520. The memory 520 is configured to store instructions, and the processor 510 is configured to execute the instructions stored in the memory 520.

The memory 520 may include a volatile memory, for example, a random access memory (RAM). The memory may alternatively include a nonvolatile memory, for example, a flash memory, a hard disk drive (HDD), or a solid-state drive (SSD). The memory 520 may alternatively include a combination of the memories of the foregoing types.

The processor 510 may be a central processing unit (CPU), a network processor (NP), or a combination of the CPU and the NP. The processor 510 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The processor 510 is configured to determine a format of the first image data, where the format of the first image data is a first image data format.

The processor 510 is configured to determine a first interface mode that is currently used, where the first interface mode is determined when the image processing apparatus establishes physical connections with the display device, and the first image data format is not an image format supported by the first interface mode.

The processor 510 is further configured to process the first image data based on the first interface mode to generate second image data, where a format of the second image data is an image format supported by the first interface mode.

Optionally, the image processing apparatus 500 further includes an output interface 530 configured to send the second image data to the display device, where the image processing apparatus is a playback device.

Optionally, the processor 510 is configured to convert the first image data from a first color space to a second color space, perform dynamic range mapping on a luminance component of image data corresponding to the second color space, where the image data corresponding to the second color space is obtained after color space conversion is performed on the first image data, restore image data obtained after performing the dynamic range mapping on the luminance component into a linear optical space, perform color gamut mapping on image data restored into the linear optical space, and perform non-uniform encoding on image data obtained after performing the color gamut mapping, to generate the second image data.

Optionally, the first image data format is an image format corresponding to an SDR, and the second image data format is an image format corresponding to an HDR, or the first image data format is an image format corresponding to an HDR, and the second image data format is an image format corresponding to an SDR, or the first image data format is an image format corresponding to an HDR of an HLG standard, and the second image data format is an image format corresponding to an HDR of a PQ standard, or the first image data format is an image format corresponding to an HDR of a PQ standard, and the second image data format is an image format corresponding to an HDR of an HLG standard.

Optionally, the first interface mode is an HDMI operation mode.

Optionally, the first image data includes a video image and/or a graphic image.

The image processing apparatus 500 according to this application may be corresponding to an implementation body of the image processing method 200 according to this application. In addition, units of the image processing apparatus 500 and other operations and/or functions described above are used to implement corresponding procedures of the method 200 in FIG. 2 respectively. For brevity, details are not described herein again.

According to the image processing apparatus in this application, image data will be processed when an image format of the image data is not supported by the first interface mode (the first interface mode is determined when the image processing apparatus establishes physical connections with the display device) such that a format of processed image data (namely, the format of the second image data) can be supported by the first interface mode, to avoid one or more seconds of black screen of the display device resulting from reinitialization of an interface mode between the image processing apparatus and the display device caused by inconsistency of the format of the first image data and the first interface mode, thereby improving viewing experience of a user.

It should be understood that sequence numbers of the foregoing processes do not mean execution sequences in the embodiments of this application. The execution sequences of the processes should be determined based on functions and internal logic of the processes, and shall not constitute any limitation on the implementation processes of this application.

A person of ordinary skill in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a specific working process of the foregoing system, apparatus, and unit, refer to a support process in the foregoing method embodiments, and details are not described herein again.

In the embodiments provided in this application, it should be understood that the disclosed system, apparatus, and method may be implemented in another manner. For example, the described apparatus embodiments are merely examples. For example, the unit division is merely logical function division and may be another division in an embodiment. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on requirements in an embodiment to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving video data having a first format, wherein the first format is an image format corresponding to standard dynamic range (SDR) or high dynamic range (HDR), wherein the first format is inconsistent with a second format supported by a first interface mode being used between a processing device and a display device of a display system, and wherein the first interface mode is a high definition multimedia interface (HDMI) operation mode; and
   outputting converted video data after converting the first format of the video data into the second format based on the first interface mode.

2. The method of claim 1, further comprising sending the converted video data to the display device, wherein the processing device is a playback device.

3. The method of claim 1, further comprising:
   converting the video data from a first color space to a second color space to obtain second converted video data corresponding to the second color space;
   performing dynamic range mapping on a luminance component of the second converted video data to obtain mapped data;
   restoring the mapped data into a linear optical space to obtain restored data;
   performing color gamut mapping on the restored data to obtain gamut mapped data; and
   performing non-uniform encoding on the gamut mapped data to generate the converted video data.

4. The method of 1, wherein:
   the first format is standard dynamic range (SDR) and the second format is high dynamic range (HDR);
   the first format is HDR and the second format is SDR;
   the first format is HDR of a hybrid log-gamma (HLG) standard and the second format is HDR of a perceptual quantizer (PQ) standard; or
   the first format is HDR of a PQ standard and the second format is HDR of an HLG standard.

5. The method of claim 1, wherein the video data comprises a video image or a graphic image.

6. An apparatus, which is a processing device or included in the processing device, comprising:
   a memory configured to store one or more programs; and
   a processor coupled to the memory and configured to execute the one or more programs to cause the apparatus to be configured to:
     receive video data having a first format, wherein the first format is an image format corresponding to standard dynamic range (SDR) or high dynamic range (HDR), wherein the first format is inconsistent with a second format supported by a first interface mode being used between the processing device and a display device of a display system, and wherein the first interface mode is a high definition multimedia interface (HDMI) operation mode; and
     output converted video data after converting the first format of the video data into the second format based on the first interface mode.

7. The apparatus of claim 6, further comprising an output interface configured to send the converted video data to the display device, and wherein the apparatus is a playback device.

8. The apparatus of claim 6, wherein when executed by the processor, the one or more programs further cause the apparatus to be configured to:
convert the video data from a first color space to a second color space to obtain second converted video data corresponding to the second color space;
perform dynamic range mapping on a luminance component of the second converted video data to obtain mapped data;
restore the mapped data into a linear optical space to obtain restored data;
perform color gamut mapping on the restored data to obtain gamut mapped data; and
perform non-uniform encoding on the gamut mapped data to generate the converted video data.

9. The apparatus of claim 6, wherein:
the first format is standard dynamic range (SDR), and the second format is high dynamic range (HDR);
the first format is HDR, and the second format is SDR;
the first format is HDR of a hybrid log-gamma (HLG) standard, and the second format is HDR of a perceptual quantizer (PQ) standard; or
the first format is HDR of a PQ standard, and the second format is HDR of an HLG standard.

10. The apparatus of claim 6, wherein the video data comprises a video image or a graphic image.

11. An apparatus, which is a processing device or included in the processing device, comprising:
a memory configured to store one or more programs; and
a processor coupled to the memory and configured to execute the one or more programs to cause the apparatus to:
receive first video data having a first format, wherein the first format is an image format corresponding to standard dynamic range (SDR), wherein a second format supported by a first interface mode being used between the processing device and a display device of a display system is an image format corresponding to high dynamic range (HDR), and wherein the first interface mode is a high definition multimedia interface (HDMI) operation mode;
output first converted video data after converting the first format of the first video data into the second format based on the first interface mode;
receive second video data having the second format, wherein the first format is now supported by a second interface mode being used between the processing device and the display device; and
output second converted video data after converting the second format of the second video data into the first format.

12. The apparatus of claim 11, wherein the processor configured to execute the one or more programs to further cause the apparatus to send the first converted video data and the second converted video data to the display device.

13. The apparatus of claim 11, wherein the processor configured to execute the one or more programs to further cause the apparatus to:
convert the first video data from a first color space to a second color space to obtain third converted video corresponding to the second color space;
perform dynamic range mapping on a luminance component of the third converted video data to obtain mapped data;
restore the mapped data into a linear optical space to obtain restored data;
perform color gamut mapping on the restored data to obtain gamut mapped data; and
perform non-uniform encoding on the gamut mapped data to generate the first converted video data.

14. The apparatus of claim 11, wherein either:
the first format is standard dynamic range (SDR) and the second format is high dynamic range (HDR); or
the first format is HDR and the second format is SDR.

15. The apparatus of claim 11, wherein the first video data comprises a video image or a graphic image.

16. The apparatus of claim 11, wherein the first format is HDR of a hybrid log-gamma (HLG) standard, and wherein the second format is HDR of a perceptual quantizer (PQ) standard.

17. The apparatus of claim 11, wherein the first format is HDR of a perceptual quantizer (PQ) standard, and wherein the second format is HDR of a hybrid log-gamma (HLG) standard.

18. The method of claim 3, wherein the second color space is red-green-blue (RGB) color space.

19. The method of claim 3, wherein the second color space is a luminance-chroma color space.

20. The method of claim 1, wherein the first interface mode is negotiated when the processing device establishes a physical connection with the display device.

* * * * *

UNITED STATES PATENT AND TRADEMARK OFFICE
CERTIFICATE OF CORRECTION

Page 1 of 1

PATENT NO. : 12,217,404 B2
APPLICATION NO. : 17/581193
DATED : February 4, 2025
INVENTOR(S) : Le Yuan, Zheng Wang and Xiumei Yan It is certified that error appears in the above-identified patent and that said Letters Patent is hereby corrected as shown below:

In the Claims

Claim 11, Column 15, Line 44: "format based on the first interface mode;" should read "format;"

Claim 11, Column 15, Line 45-46: "receive second video data having the second format, wherein the first format is now supported by a" should read "receive second video data having the second format based on the first interface mode, wherein the first format is now supported by a"

Claim 13, Column 16, Line 15: "corresponding to the second color space;" should read "data corresponding to the second color space;"

Signed and Sealed this
First Day of April, 2025

Coke Morgan Stewart
*Acting Director of the United States Patent and Trademark Office*